Oct. 23, 1951    T. O. McCARTHY ET AL    2,572,044
ELECTRICAL TRANSMISSION SYSTEM
Filed March 10, 1947    7 Sheets-Sheet 5

INVENTOR.
THOMAS O. McCARTHY
WILBUR W. THOMAS
BY
ATTORNEY

Patented Oct. 23, 1951

2,572,044

UNITED STATES PATENT OFFICE 2,572,044

ELECTRICAL TRANSMISSION SYSTEM

Thomas O. McCarthy and Wilbur W. Thomas,
United States Navy

Application March 10, 1947, Serial No. 733,715

22 Claims. (Cl. 318—24)

(Granted under the act of March 3, 1883, as
amended April 30, 1928; 370 O. G. 757)

This invention relates in general to electrical systems for transmitting angular motion and particularly to means for controlling the synchronous relationship of repeater and transmitter units of electrical synchronous transmission systems.

A commonly used type of such electrical system includes transmitting and repeating units which are generally alike. Each comprises a single-circuit field winding and a polycircuit armature winding, one of which consists of a stationary element or stator, and the other a moving element or rotor. The field windings of the transmitter and repeater units are excited by suitable source of alternating current and the respective armature windings of each unit are interconnected.

These systems are used for many purposes and under normal conditions the repeater unit will follow the transmitter unit degree for degree. Under some conditions, however, it is desired to have the repeater not follow the transmitter degree for degree. For example, in the art of the remote-reading compass it is desirable to introduce a correction for well-known compass errors such that the repeater or follow-up units will automatically be compensated. Similarly, in radio direction finders there exists an error that resembles a deviation error found in the compass art. This error, also, can be corrected or compensated for to provide an approximately true repeater indication. Likewise, in ordnance direction-finding systems such as used for target designation the transmitted direction must be modified to allow for parallax error before the gun range finder or searchlight will point at the target being designated by the locating instrument. There are many other installations incorporating direction transmission systems where it is likewise desirable to provide a controllable asynchronous relationship between the transmitter and repeater units.

One means for controlling the transmitter and repeater elements to correct for such errors is described and claimed in a copending application of one of the present applicants, Serial No. 535,529, filed May 13, 1944. The present invention provides a new means for accomplishing these and other functions.

An object of this invention is to provide new and improved means for effecting a controllable asynchronous relationship between the transmitter and one or more repeater units of electrical synchro transmission systems.

Another object is to provide means for varying the degree of asynchronism between transmitter and repeater units depending upon the instant angular position of the transmitter rotors or of the repeater rotors.

A further object is to provide a novel rotor element for use with repeater or transmitter units for providing a controllable asynchronous relationship between said elements.

A still further object is to provide a means for effecting a controllable asynchronous relationship between transmitter and repeater units in a self-synchronous transmission system wherein there is a minimum effect upon the transmission torque of the systems.

Another object is to incorporate the features of this invention in the electrical transmission system of a gyromagnetic compass for correcting magnetic compass errors whereby the gyro will indicate true magnetic bearing.

Further objects and advantages of this invention, as well as its construction, arrangement and operation, will be apparent from the following description and claims in connection with the accompanying drawings, in which.

In accordance with the present invention, the controllable relationship between transmitter and repeater units is accomplished by providing the field element of one of these units with an additional winding, preferably at right angles to the usual winding, and supplying this winding with a voltage variable in a predetermined manner. In the embodiments described herein this controlling or correcting voltage is provided by a voltage generator having a rotatable primary element driven as a function of the rotation of the rotor elements of the transmitter or repeater units or in other desired manner. The cyclic asynchronous relationship between transmitter and repeater units may be regular, i. e., sinusoidal, quadrantal, etc., or irregular depending upon the control voltages applied.

Figure 1:
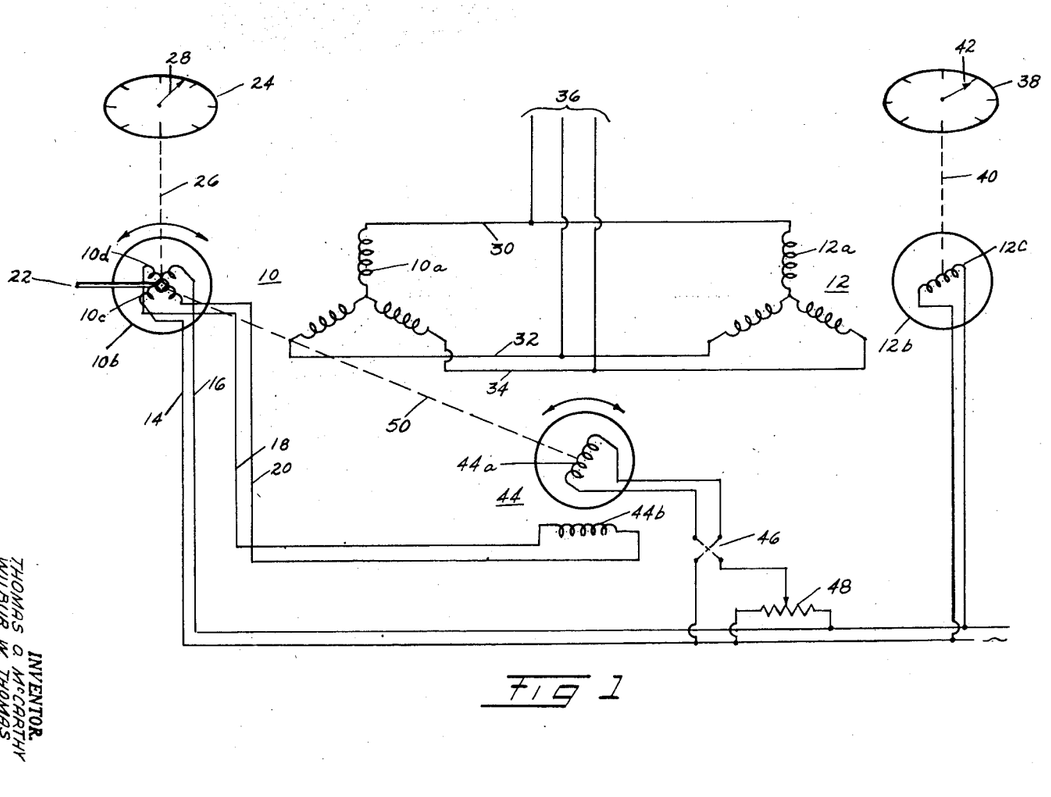
Fig. 1 is a diagrammatic illustration of one embodiment of the system of this invention.

Fig. 1 shows diagrammatically a synchronous transmission system having a transmitter unit 10 and a repeater unit 12. The transmitter unit consists of a stationary, Y-connected, polycircuit armature winding 10a, the three components of which are tapped at 120° points, and a rotatably mounted field element 10b. As previously explained, the field and armature elements may be reversed, i. e., the armature winding may be the rotatable element and the field element may be stationary.

Normally the field element or rotor 10b of the transmitter is provided with a single-circuit field winding 10c energized from a suitable source S of alternating current through conductors 14 and 16. In accordance with this invention, a second field winding 10d is provided and is energized with a variable voltage through conductors 18 and 20. The two windings 10d and 10c are preferably at right angles so that there will be a minimum inductive effect between the windings.

The field element or rotor 10b of the transmitter is rotated by any suitable means such as shaft 22, which may be driven either directly or indirectly from the direction finding element of remote-reading compass systems, ordnance-direction-finding systems, etc., or may be coupled into other systems as will be apparent from the description below.

A master indicator 24 is mechanically connected to a rotatable element 10b by suitable shaft means illustrated diagrammatically by the dashed line 26. The indicator hand 28 is adjusted to indicate zero position on the dial when the normal winding 10c is at electrical zero and indicates the angular position of this coil with respect to electrical zero as this coil rotates through 360 degrees.

The repeater unit 12 is provided with a stationary, Y-connected, polycircuit armature 12a similar to that of the transmitter unit, and a rotatably mounted field element 12b having only the normal single-circuit winding 12c. This winding is energized with alternating current from a source S common with that of the normal field winding 10c of the transmitter unit. The armature windings 10a and 12a of transmitter and repeater units respectively are connected by means of conductors 30, 32 and 34. Additional repeater units may be connected in parallel by means of conductors at 36.

An indicator 38 is shown attached to the rotatable element 12c of the repeater by means of a mechanical connection shown diagrammatically at 40. The indicator hand 42 indicates the instant angular position of the repeater field winding 12c, which, if no voltage were applied to coil 10d of the transmitter, would align itself in the same position with respect to the stator windings as the coil 10c. In the normal synchronous transmission system the indicator hands 28 and 42 of transmitter and repeater respectively would read alike.

As previously pointed out, it is often desirable that the repeater position be displaced from the transmitter position in order to compensate for error incurred in some systems. In order to control the displacement of repeater from transmitter or the asynchronism of the units the additional field winding 10d of the transmitter unit is energized by a voltage that is variable in a controllable manner. Thus, in the embodiment shown herein in Fig. 1, a voltage generator 44 is provided that includes a rotatably adjustable primary winding 44a and a stationary secondary winding 44b. The secondary winding 44b is connected to the winding 10d of the transmitter by means of the conductors 18 and 20 and the primary winding 44a is energized in parallel with windings 10c and 12c through reversing switch 46 and potentiometer 48. A mechanical connection is provided between the rotor 10b of the transmitter and the rotatable primary 44a of the voltage generator as shown by dashed line 50. The primary 44a may be rotated at a 1 to 1 ratio with respect to rotor 10b or may be rotated at other ratios by suitable gears or cams depending upon the nature of the correction desired.

In most transmission systems there is sufficient torque available so that the added torque required to drive the voltage generator is of little concern. If, however, a low-inertia system is involved the magnetic-circuit design of the voltage generator may be altered so that no increase in input torque is required as it is loaded.

The position of the primary 44a with respect to the secondary 44b controls the amplitude and phase of the voltages supplied to the winding 10d. The amplitude of the voltages, also, is regulated by the potentiometer 48.

In the normal self-synchronous system, wherein the rotors of the transmitter and repeater units are wound alike and corresponding to the system of Fig. 1 with no voltage supplied the winding 10d, the repeater rotors follow the rotation of the transmitter rotor for the following reasons:

The rotor windings are excited by an alternating current and will induce an alternating E. M. F. in each of the respective stator windings to which they are inductively coupled. The magnitude of the E. M. F. induced in each of these windings depends upon the relative angular position of the rotor winding with respect to each of the stator windings, since only the component of the linkage flux parallel to each of the stator coils will induce an E. M. F. in them. For any given position of the rotor the voltages in the stator windings are unequal either in magnitude or phase. However, since the repeater has similar characteristics to the transmitter and is excited from the same source, the voltages induced in the repeater stator windings are equal and in phase opposition to those induced in the transmitter stator windings when the rotors of both units are in the same angular positions with respect to their stator windings. Under such conditions there is no current through the conductors between the stator elements and the system is in equilibrium.

Rotation of the transmitter rotor, however, causes a transient change in such equilibrium, since the voltages induced in the stator windings of this unit will vary, and a current is set up in the conductors between transmitter stator and repeater stator. This current sets up torque fields of flux and these torque fields exert a torque on the rotors of each unit. Since the transmitter rotor is fixed against rotation by the mechanism that turned it, the repeater rotor will rotate until it is in corresponding angular position with the transmitter rotor, at which time the voltages induced in the repeater stator windings are again equal and in phase opposition to those induced in the transmitter stator and equilibrium is regained.

The application of a voltage to the additional winding, in accordance with this invention causes a resultant linkage flux, differing from that due to the normal rotor winding, to be set up in the rotor element of the transmitter unit, which in turn induces abnormal voltages in the stator winding. Current thus flows in the conductors between stator windings of repeater and transmitter units and a torque field of flux is set up. The rotor of the repeater aligns with this torque field at which time the system is in equilibrium. The repeater rotor is now, however, in a different angular position than the transmitter rotor.

A graphic illustration showing vectorial representations of the flux fields set up in the transmitter rotor, and explaining the cyclic asynchronism between transmitter and repeater units for the embodiment shown in Fig. 1, is given in Figures 7 through 12. In this instance the voltages supplied the control winding $10d$ are increased from zero at the normal zero position of the transmitter rotor to a maximum at 90 degrees rotation, back to zero at 180 degrees, to a maximum of opposite phase at 270 degrees and back to zero again at 360 degrees. This is accomplished by rotation of the primary windings $44a$ of the voltage generator $44$ at a 1 to 1 ratio with the rotation of the transmitter rotor $10b$.

Symbols used in connection with Figs. 7 through 12 are defined as follows:

$\phi_1$—Flux due to constantly excited transmitter rotor winding. Also indicates angular position of normal transmitter rotor winding.
$\phi_2$—Flux due to variably excited transmitter rotor winding.
$\phi_3$—Resultant flux (also indicates angular position repeater rotor will assume).
$\theta$—Angle between normal flux and resultant flux (also angle between transmitter and repeater).

Figs. 7 through 12 show the angular positions of the two transmitter field windings $10c$ and $10d$ and the flux fields set up thereby for successive 45 degree positions of the transmitter rotor through 225 degrees. Flux positions for any angular position of the rotor up to 360° may be readily approximated.

Figure 7:
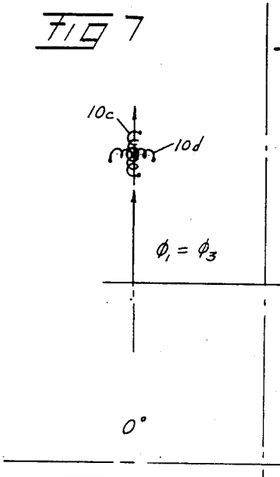
Figs. 7 through 12 are vector diagrams illustrating the theory of operation of this invention.

In Fig. 7 the normal winding $10c$ is assumed to be at electrical zero. In this position the pointer $28$ of the dial $24$, Fig. 1 would indicate zero and since the primary winding $44a$ of the voltage generator $44$ would be perpendicular to the secondary winding $44b$ there would be no voltage in the winding $10d$. Therefore the flux field set up would be due only to the voltage in winding $10c$. The direction and magnitude of this flux is represented as vector $\phi_1$ in Figure 7. In this position $\phi_1$ is equal to $\phi_3$.

Figures 8, 9:
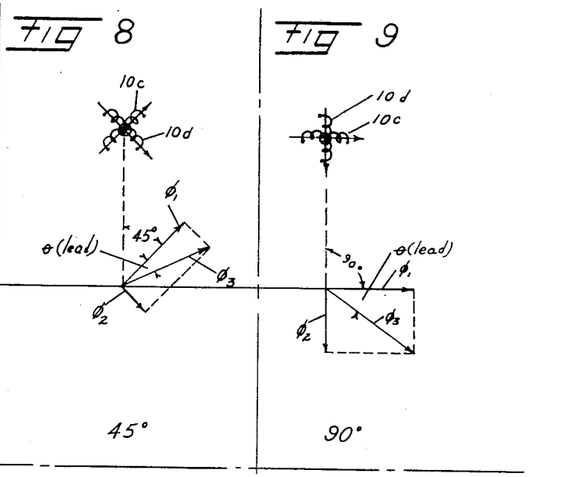

In Fig. 8 it is assumed that the rotor $10b$ has been rotated through a 45° angle. The primary winding $44a$ of the voltage generator is likewise rotated through a 45° angle. The flux due to the constant voltage in winding $10c$ is again shown by $\phi_1$, and since a voltage is now induced in the secondary winding $44b$ of the voltage generator and connecting winding $10d$ of the transmitter rotor, a flux is set up proportional to the magnitude and phase of this voltage, as represented by $\phi_2$. The resultant flux is indicated by vector $\phi_3$. The winding $12c$ of the repeater rotor will be positioned in accordance with the resultant flux $\phi_3$ and thus the indicator hand $42$ of the repeater will lead the indicator hand $28$ of the transmitter by an angle $\theta$.

Figure 10:
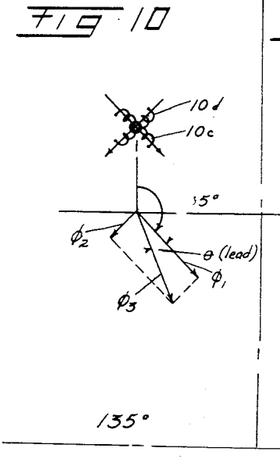
Figures 11, 12:
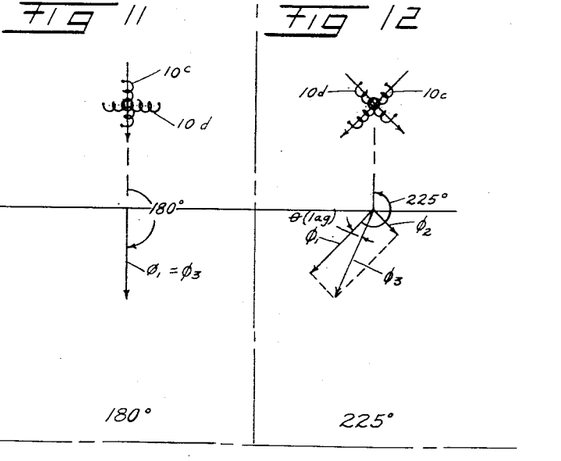

As the rotor $10b$ is rotated through 90°, the primary $44a$ of the voltage generator $44$ becomes parallel to the secondary $44b$ and a maximum voltage is supplied coil $10d$. As shown in Fig. 9 the vector $\phi_2$ thereby increases and the angle $\theta$ by which $\phi_3$ leads $\phi_1$, or indicator hand $42$ leads indicator hand $28$, is at a maximum. Fig. 10 shows the resultant $\phi_3$ for a rotation of 135°. In this position $\phi_3$ still leads $\phi_1$ but the angle of lead $\theta$ is decreasing. At 180°, as shown in Fig. 11, the winding $44a$ is again perpendicular to the secondary winding $44b$ and no voltage is furnished the control winding $10d$, thus $\phi_1$ again equals $\phi_3$ and both pointers $28$ and $42$ would read 180°. At 225°, as shown in Fig. 12, a voltage is again induced in the secondary winding $44b$ and thus supplied to winding $10d$, and a resultant flux $\phi_3$ due to the voltage in the two windings $10c$ and $10d$ is present in the stator winding. In this position it will be noted that $\phi_3$ lags $\phi_1$. This is due to the fact that as winding $44a$ rotates past 180° the polarity of the voltage induced in the winding $44b$ is reversed. Application of sinusoidally varying control voltages to the winding $10d$ produce a sinusoidally varying degree of asynchronism between transmitter and repeater units for rotation through 360°.

Figure 5:
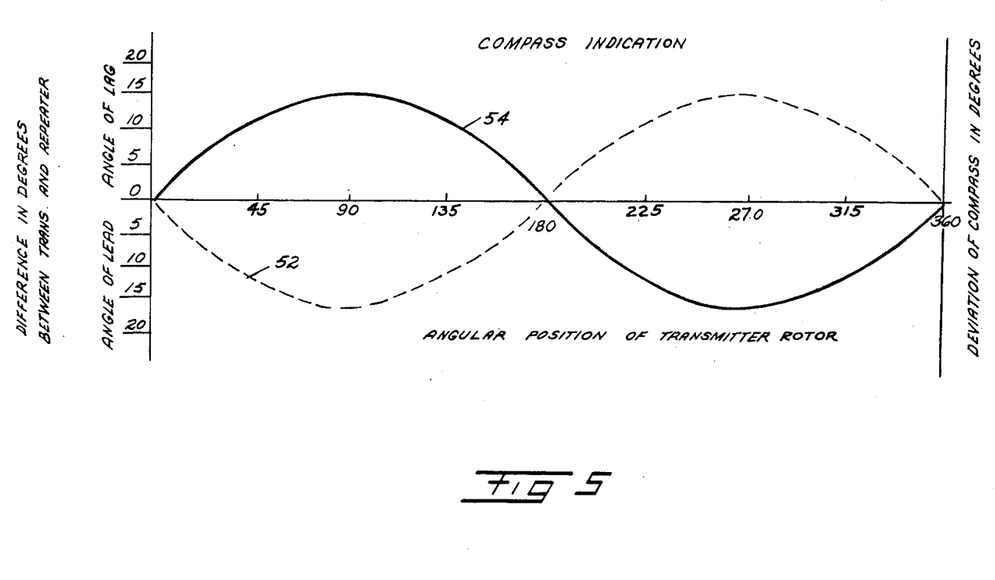
Fig. 5 is a graphic illustration showing a typical compass deviation curve and a correction curve therefor representing angular difference in repeater and rotor units of the system comprising this invention.

This asynchronous relationship is illustrated by the curve $52$ shown in dotted lines in Fig. 5. It can be seen that at the zero degree and 180 degree positions of the transmitter rotor there is no difference in the readings of transmitter and repeater. At 90 degrees the repeater leads the transmitter by a maximum amount, and at 270 degrees the repeater lags the transmitter by a maximum amount.

If it is desired to displace the curve $52$ by 180°, it is necessary only to reverse the switch $46$ thereby reversing the polarity of the voltage applied to the control winding $10d$.

The amplitude of the curve $52$, representative of the degree of asynchronism between transmitter and repeater units, can be adjusted by changing the potentiometer resistance $48$.

If, it is desired to shift the curve $52$ along its axis a definite amount either forward or backward it is merely necessary to adjust the transmitter rotor with respect to the pointer of its indicator so that the indicator will read the desired number of degrees forward or backward from zero when the transmitter rotor is actually positioned at electrical zero.

In the magnetic-compass art a deviation error appears which is caused by the magnetism of the vessel or other carrier upon which the compass system is carried. The amount of error varies with the magnetic heading of the ship and when it is plotted as an ordinate against compass indication as an abscissa, a curve results having sinusoidal characteristics. The curve shown in solid line and indicated as $54$ (Fig. 5) is typical of such a deviation curve.

Thus in compass systems including self-synchronous transmission systems for repeating compass indications, it will readily be seen that compass deviation error can be compensated by incorporating the features of this invention. To correct deviation error as shown by the curve $54$, Fig. 5, it is necessary only to control the relationship between transmitter and repeater units to produce a curve representative of asynchronism equal in amplitude and opposite in phase to the deviation curve. The way in which such a curve, i. e., curve 52, is produced has already been described.

The amplitude of the deviation-error curve increases with a change of latitude. For a ship or other craft sailing on a course other than east or west a change in the amplitude of the correction curve is therefore necessary. This is accomplished by varying the potentiometer resistance 48 which will vary the amplitude of the voltage to control winding 10d and thus change the magnitude of the correction curve. This potentiometer can be calibrated in degrees of latitude and by manually setting the desired correction can be simply and easily applied.

Figure 2:
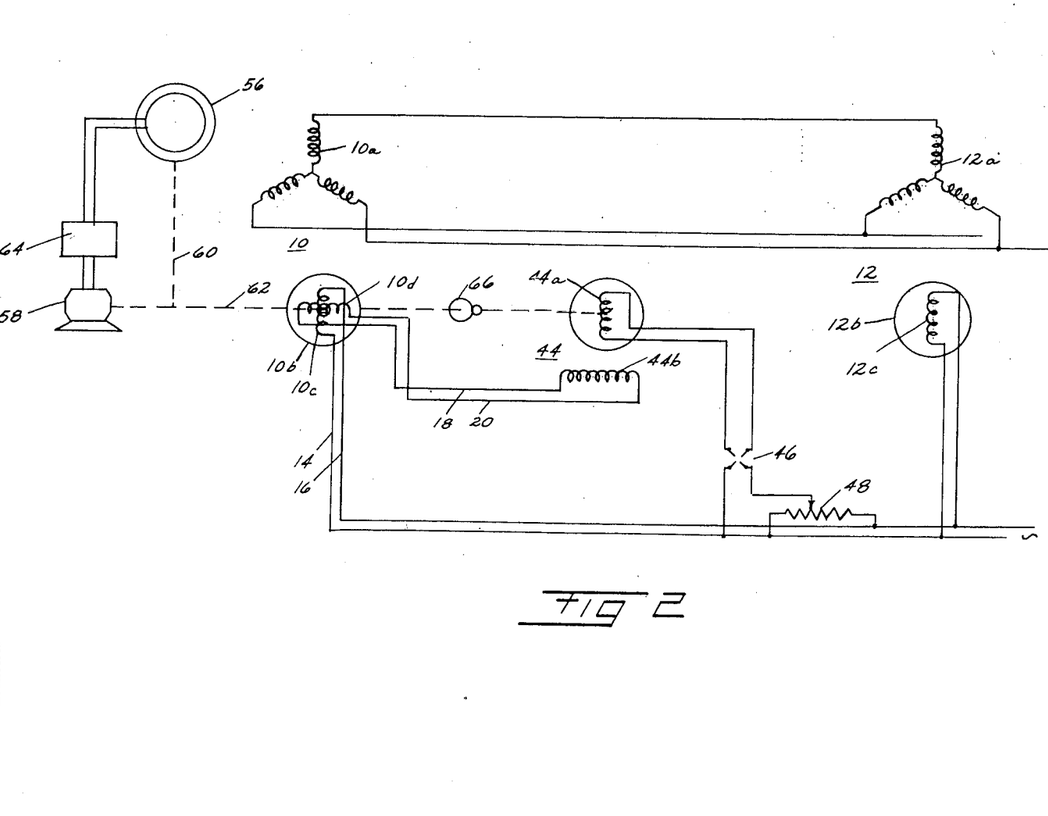
Fig. 2 is a diagrammatic illustration of the control system of this invention as applied to a radio direction finding compass.
Figure 6:
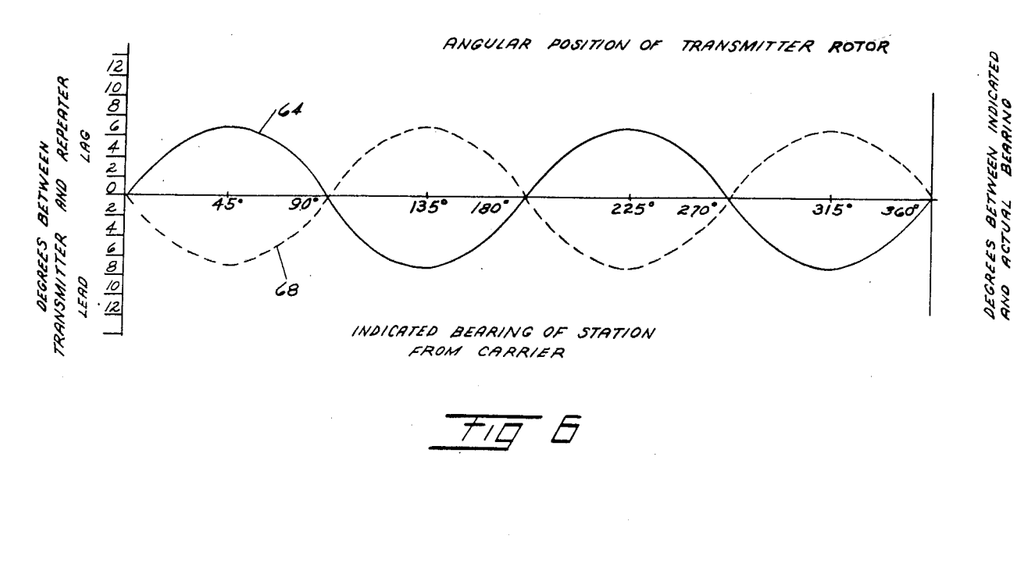
Fig. 6 shows a typical deviation curve for a radio direction finding system and a compensating curve therefor as produced by the system of this invention.

Fig. 2 shows the system of this invention as applied to a radio-direction-finder system. An antenna loop 56 is mechanically connected to transmitter rotor 10b and to drive-motor 58 as shown by dotted lines 60 and 62. The signal from the antenna loop 56 is fed to an amplifier 64 and the amplified signal is fed to the drive-motor 58. In response to signal from the antenna loop 56 the motor 58 positions the antenna loop 56 and also the rotor element 10b of the transmitter unit 10. Since the deviation curve for an aircraft radio compass is usually quadrantal in nature, as shown by the curve in solid line designated as 64 in Fig. 6, it is necessary to supply a quadrantally varying voltage to the control winding 10d of the transmitter rotor 10b. This is accomplished by rotating the primary winding 44a of the voltage generator 44 at a 2 to 1 ratio with respect to the transmitter rotor 10b. Suitable gearing, as shown diagrammatically at 66, can be provided to accomplish this function. In accordance with such operation, a quadrantal correction curve representative of degrees of asynchronism between repeater and transmitter units is produced as shown by the curve 68, Fig. 6. The amplitude of this correction curve can also be varied by varying the potentiometer resistance 48.

Figure 3:
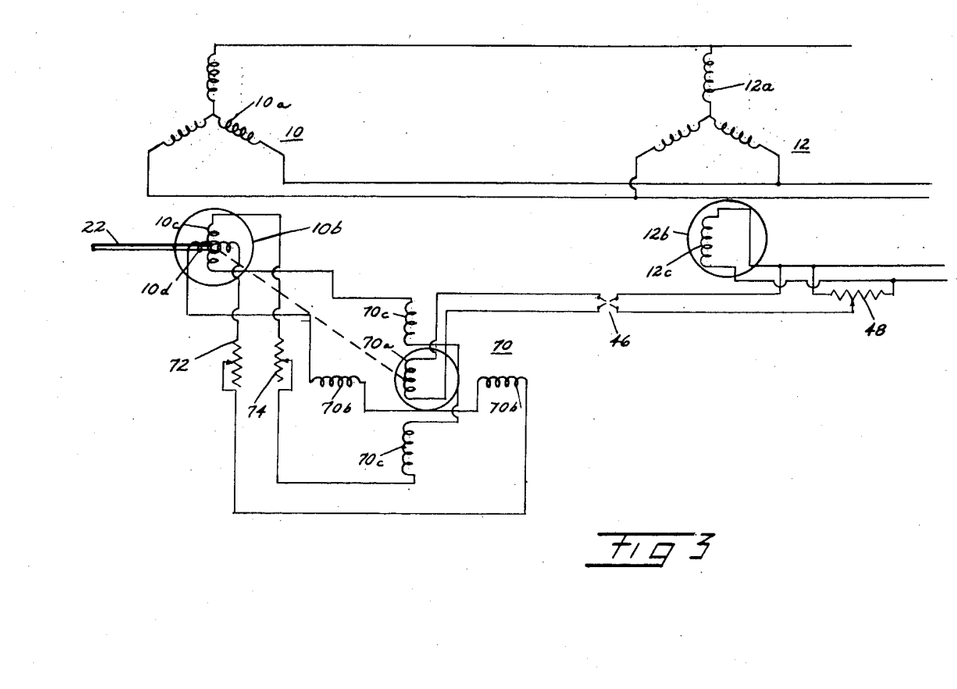
Fig. 3 is a diagrammatic illustration of a modification of the embodiment shown in Fig. 1.

In order to increase the amplitude of the cyclic asynchronism still further a somewhat different system can be utilized as shown in Fig. 3. In this figure transmitter and repeater units 10 and 12 are shown as in Fig. 1. The rotor 10b of the transmitter unit 10 is provided with two windings 10c and 10d and is driven by suitable shaft means as 22. In this embodiment, however, both windings 10c and 10d are energized by voltages from a voltage generator. This generator, designated in Fig. 3 as 70, is of somewhat different construction than that shown in Fig. 1. A primary winding 70a is provided and is energized through potentiometer 48 and reversing switch 46 from a common source of alternating current in parallel with the rotor winding 12c of the repeater unit 12. The voltage generator 70, however, is provided with two pairs of secondary windings 70b and 70c respectively, each pair of which is connected in series with one of the windings 10c and 10d. Series resistances 72 and 74 are provided in each of the circuits through the rotor windings. If the resistances 72 and 74 are equal, first one of the rotor windings and then the other will provide the controlling voltage as the shaft 22 is rotated. In the position shown in Fig. 3 winding 10c is provided with a maximum voltage and there is no voltage through in winding 10d. At 90° the reverse would be true with a maximum voltage in winding 10d and no voltage in winding 10c. One of the windings can be adjusted to provide a greater maximum voltage by adjustment of the resistances 72 and 74. It will be evident that there are many combinations possible with this system and with the system shown in Fig. 1, whereby the asynchronous relationship between transmitter and repeater units can be controlled as desired to fit any particular situation.

Figure 4:
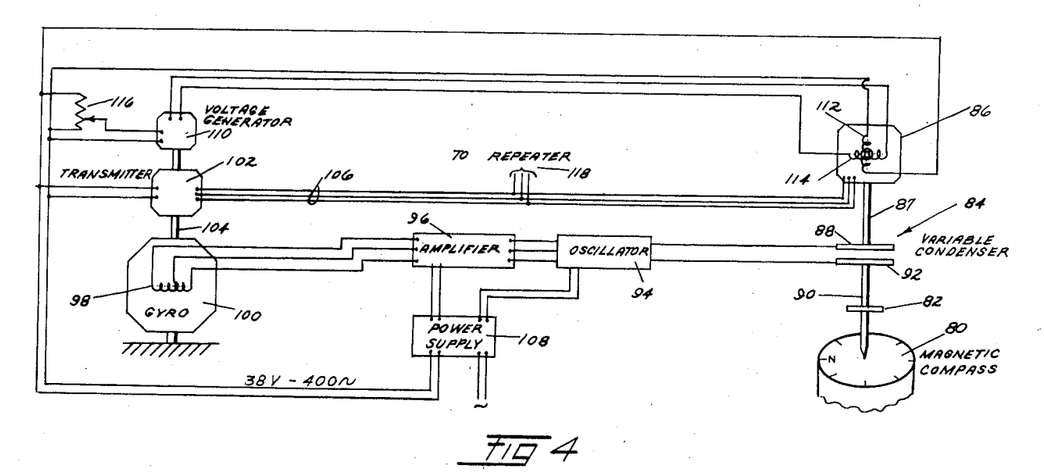
Fig. 4 is a diagrammatic illustration of a gyro magnetic compass embodying the features of this invention.

Fig. 4 shows a gyro magnetic compass system incorporating the features of this invention for the purpose of compensating deviation error thereby to eliminate conventional expensive and intricate mechanical compensators.

A conventional gyro magnetic compass system includes a directional gyro and magnetic compass unit which "slaves" the gyro to the magnetic meridian. The gyro alone is not north seeking but becomes so when influenced by an electrical signal which originates at a capacity pickup on the compass. This signal is electronically amplified and is applied to a small precessing coil mounted on the gyro vertical ring to produce a torque in a direction as always to bring the gyro into agreement with the heading of the compass. A self-synchronous transmission system provides data between the gyro and the compass. This data provides the pickup condenser at the compass with a constant reference to the gyro heading.

In Fig. 4 a magnetic compass is shown diagrammatically at 80. Directly over the magnetic compass are mounted a follower magnet 82, a variable condenser pickup system 84 and a self-synchronous repeater 86. Attached to the repeater shaft 87 is a horizontally placed semicircular plate 88 which comprises one side of the variable condenser 84. The follower magnet shaft 90 rotates the other condenser plate 92 which is very small in size and weight and imposes minimum frictional load upon the magnetic compass element. An oscillator 94 provides radio-frequency current for the condenser 84 and delivers a signal from the pickup condenser through an amplifier 96 to precessing coils 98 of a gyro unit 100. A self-synchronous transmitter 102 is mounted above the gyro 100, the rotor of which is coupled by means of shaft 104 to rotate as the gyro precesses about its vertical axis. The stator of transmitter 102 is connected to the stator of repeater 86 by means of conductors 106. Power for the oscillator, amplifier and self-synchronous transmission system is supplied at suitable voltages and frequency from power-supply unit 108.

Under normal operating conditions (craft on a steady course) the condenser plate 92, which is positioned by the magnetic compass, and the condenser plate 88, which is positioned by the gyro unit through the self-synchronous transmission system, will be in such a position with respect to each other that the current flowing in each half of the precessing coil 98 produces equal and opposite torques about the horizontal axis of the gyro. The system is then in equilibrium and the gyro will indicate the magnetic heading of the craft. Should the craft change to a course other than that which it has been steering, the condenser plates 88 and 92 will move out of alignment and more current flows through one half of precession coil 98 than through the other, thus providing a precessional torque that causes the gyro to precess about its vertical axis to a position which brings the condenser plates 88 and 92 back into alignment. The gyro will then again indicate the magnetic heading of the craft.

Existing correctors for deviation and for latitude correction includes intricate mechanical devices upon the magnetic compass 80. When the system is in equilibrium the gyro then reads the same as the magnetic compass.

Since the transmission system described herein can be adapted to compensate for deviation error and to provide more accurate corrected craft headings it is applied successfully to such a gyro magnetic compass system. In accordance with the principles of this invention, therefore, a voltage generator 110, which may be of the type shown in Fig. 1, is coupled to the vertical shaft of the gyro unit. The repeater unit 86 is provided with a doubly wound rotor which is mechanically connected to the condenser plate 88. Optionally, the doubly wound rotor could be used with the transmitter unit 102 in the manner shown in Fig. 1. One winding 112 is constantly excited from a common source of alternating current with that exciting the rotor winding of the transmitter 102. The other winding 114 is connected to the output of the voltage generator 110. The primary element of the voltage generator 110 is supplied with an alternating current from a source common with that exciting the normal windings of the transmitter and repeater units, through a potentiometer resistance 116. This element rotates with the vertical shaft of the gyro 100 at any desired ratio depending on the required correction voltages. The stationary secondary element is connected to winding 114.

In operation, the correction system causes the condenser plate 88 to align with plate 92 after a greater or lesser amount of precession than would normally occur. The system reaches equilibrium with the gyro at an angular position differing from that of the magnetic compass. By properly regulating the voltage output of the voltage generator 110 the gyro and transmitter unit can be made to assume an angular position differing from that of the magnetic compass and special repeater unit by the value of the deviation error and the expensive mechanical compensators on the compass can be eliminated. The gyro will thereby indicate a substantially true magnetic heading of the craft and the transmitter unit 102 will provide transmission data representative of this heading. A normal repeater unit, connected into the system as at 118, will thereby repeat true magnetic heading.

Other voltage systems, such as that illustrated in Fig. 3, can be applied to the gyro magnetic compass system as shown in Fig. 4.

Modifications and changes can be made in this invention without departing from the spirit and scope thereof as set forth in the appended claims.

The invention described herein may be manufactured and used by or for the Government of the United States of America for governmental purposes without the payment of any royalties thereon or therefor.

What is claimed is:

1. In an electrical data-transmitting system, a rotatable field element having a pair of windings arranged in space quadrature, an armature circuit coupled to said field element, and electrical means for selectively exciting at least one of said windings with voltages varying in accordance with changes in the angular position of said field element relative said armature circuit.

2. In an electrical synchro signal transmitting system, a rotatably mounted field element having a pair of field windings at right angles relative to each other, a polyphase armature circuit inductively coupled to said field element, and electrical means for selectively exciting said field windings with voltages varying as a function of the instant angular position of said field element.

3. In an electrical synchro signal transmitting system, a rotatably mounted field element having a pair of field windings at right angles relative to each other, a polyphase armature circuit inductively coupled to said field element, means for providing one of said field windings with a constant exciting voltage, and electrical means for providing said other field winding with an exciting voltage varying as a function of the instant angular position of said field element.

4. In an electrical data-transmitting system, a dynamoelectric unit having relatively movable armature and field elements, one of said elements comprising a pair of windings arranged in space quadrature, and electrical means for selectively exciting said windings with voltages varying in response to alterations in the relative position of said elements.

5. The combination as defined in claim 4 further characterized by means for controlling the amplitude of said voltages.

6. The combination as defined in claim 4 further characterized by means for reversing the phase of said voltages.

7. In an electrical synchro signal transmitting system, a synchro unit having relatively movable armature and field elements, said field element comprising a pair of field windings at right angles relative to each other, means for selectively exciting said field windings with voltages varying as a function of the relative angular position between said armature and field elements, means for controlling the amplitude of said selected voltages, and means for reversing the phase of said selected voltages.

8. A system for transmitting angular motion comprising a motion transmitter device having relatively movable armature and field elements, a motion repeating device having similar elements, electrical connections between the armature elements of said devices, means for impressing a constant voltage on the field elements of said transmission and repeating elements whereby said repeater normally follows the motion of said transmitter, and rotary transformer means mechanically coupled to one of said devices for impressing an additional voltage upon the field element of said one device, whereby said repeater assumes a position differing from that of the transmitter by an amount proportional to the amplitude of said additional voltage.

9. A system for transmitting angular motion comprising a motion transmission device having relatively movable armature and field elements, a motion repeating device having similar elements, electrical connections between the armature elements of said devices, means for impressing a constant voltage on the field elements of said transmission and repeating elements whereby said repeater normally follows the motion of said transmitter, an additional winding on the field element of one of said devices, and rotary transformer means coupled to said one device for impressing a control voltage upon said additional winding, whereby said repeater assumes a position differing from that of said transmitter by an amount proportional to the amplitude of said control voltage.

10. A system for transmitting angular motion comprising a motion transmission device having relatively movable armature and field elements, a motion repeating device having similar elements, electrical connections between the armature elements of said devices, means for impressing a constant voltage on the field elements of said transmission and repeating elements whereby said repeater normally follows the motion of said transmitter, an additional winding on the field element of one of said devices, a rotary transformer having relatively rotatable armature and field elements, a mechanical link between one of the elements of said rotary transformer and an element of said transmission device, and a connection between the other element of said rotary transformer and said additional winding for impressing a control voltage upon said additional winding that varies as a function of the angular position of one of said transmitter and repeater devices, whereby said repeater assumes a position differing from that of said transmitter by an amount dependent upon the instant angular position of said devices.

11. A system for transmitting angular motion comprising a motion transmission device having relatively movable armature and field elements, a motion repeating device having similar elements, electrical connections between the armature elements of said devices, means for impressing a constant voltage on the field elements of said transmission and repeating devices whereby said repeater normally follows the motion of said transmitter, an additional winding on the field element of one of said devices at right angles to the normal field winding, a rotary transformer having relatively rotatable armature and field elements, a mechanical link between one of the elements of said rotary transformer and an element of said transmission device, and a connection between the other element of said rotary transformer and said additional winding for impressing a control voltage upon said additional winding, whereby said repeater assumes a position differing from that of said transmitter by an amount proportional to the amplitude of said control voltage.

12. A system for transmitting angular motion comprising a motion transmission device having relatively movable armature and field elements, a motion repeating device having similar elements, electrical connections between the armature elements of said devices, means for impressing a constant voltage on the field elements of said transmission and repeating devices whereby said repeater normally follows the motion of said transmitter, an additional winding on the field element of one of said devices, means for providing a variable control voltage to said additional winding, said means comprising a voltage generator, means for controlling the amplitude and phase of the output voltage from said voltage generator, whereby said repeater assumes a position differing from that of said transmitter by an amount proportional to the amplitude of said control voltage and in a direction dependent upon the phase of said control voltage.

13. A system for transmitting angular motion comprising a motion transmission device having relatively movable armature and field elements, a motion repeating device having similar elements, electrical connections between the armature elements of said devices, means for impressing a constant voltage on the field elements of said transmission and repeating devices whereby said repeater normally follows the motion of said transmitter, an additional winding on the field element of one of said devices, means for providing a variable control voltage to said additional winding, said means comprising a voltage generator having relatively movable primary and secondary members, means for providing one of said members with an adjustable voltage, means for controlling the relative movement of said primary and secondary members, and means connecting the output of one of said members to said additional field winding, whereby said repeater assumes a position differing from that of said transmitter by an amount proportional to the value of said control voltage.

14. A system for transmitting angular motion comprising a motion transmission device having relatively movable armature and field elements, a motion repeating device having similar elements, electrical connections between the armature elements of said devices, means for impressing a constant voltage on the field elements of said transmission and repeating devices whereby said repeater normally follows the motion of said transmitter, an additional winding on the field element of one of said devices, means for providing a cyclicly varying control voltage to said additional winding, said means comprising a voltage generator having a rotatable primary and a stationary secondary, means for energizing said primary, means for connecting the output of said secondary to said additional field winding, and means for rotating said primary as a function of the rotation of said transmitter, whereby said repeater assumes a position differing from that of said transmitter by an amount dependent upon the instant angular position of said transmitter.

15. In a system for transmitting angular motion, transmitter and repeater units each having field and armature elements, one of said elements in said transmitter and repeater units constituting the rotor thereof and the other element constituting a stator, means electrically connecting the armature element of the transmitter with the armature element of the repeater, means for impressing a constant voltage on the field elements of transmitter and repeater units whereby the rotor of the repeater would normally follow motion of the rotor of the transmitter unit, and rotary transformer means mechanically coupled to one of said devices for impressing an additional voltage upon the field element of one of said units whereby the repeater rotor assumes a position differing from that of the transmitter rotor by an amount proportional to the amplitude of said additional voltage.

16. In a system for transmitting angular motion, transmitter and repeater units each having field and armature elements, one of said elements in said transmitter and repeater units constituting a rotor thereof and the other element constituting a stator, means electrically connecting the armature element of the transmitter with the armature element of the repeater, means for impressing a constant voltage on the normal field windings of the transmitter and repeater units whereby the rotor of said repeater would normally follow the motion of the rotor of said transmitter unit, an additional field winding on one of said units, means for impressing a cyclicly varying voltage on said additional field winding, said means comprising a voltage generator having a secondary member and a primary member rotatable with respect thereto, means for rotating said primary member as a function of the rotation of said transmitter rotor, and means connecting the output voltage of said voltage generator to said additional winding, whereby the rotor of said repeater unit assumes a position differing from that of said transmitter rotor by an amount dependent upon the instant angular position of said transmitter rotor.

17. A system for transmitting angular motion comprising a motion transmission device and a motion repeating device, said devices having similar interconnected polyphase armature windings, one of said devices having a normal single circuit field winding, the other of said devices having a pair of field windings at right angles relative to each other, means for energizing said single circuit field winding, and rotary transformer means coupled to one of said devices for selectively providing said pair of field windings with control voltages, whereby to provide a controllable asynchronous relation between said repeating and transmitting devices.

18. A system for transmitting angular motion comprising a motion transmission device and one or more motion repeating devices, said devices having similar interconnected polyphase armature windings, said repeaters having single circuit field windings, said transmitter having a pair of field windings at right angles relative to each other, a voltage generator having a rotatable primary and a pair of secondary windings at right angles relative to each other, one of said field windings of said transmitter being connected in series with one of said secondary windings and the other of said field windings of said transmitter unit being connected in series with the other of said secondary windings, means energizing the field elements of said repeater units and the primary of said voltage generator from a common source, and means rotating said primary of said voltage generator as a function of the rotation of said transmitter unit, whereby said repeater assumes a cyclic asynchronous relationship with respect to said transmitter.

19. A motion transmission system for compasses having quadrantal deviation error comprising a motion transmission device having relatively movable armature and field elements one of which is mechanically coupled to said compass, one or more motion repeating devices having similar elements, electrical connections between said transmitting and repeating devices, said field element of said transmitting device having an additional field winding, means for providing said additional field winding with control voltages varying quadrantally during a revolution of said transmitting device, and means for controlling the amplitude and phase of said control voltages, whereby said repeating devices assume a cyclic asynchronous relationship with respect to said transmitting device, the amount of asynchronism being substantially equal and opposite to said quadrantal deviation error.

20. Electrical transmission apparatus for correcting deviation error in a gyro-magnetiic compass system, wherein said gyro is precessed in response to electrical signal data controlled by a variable condenser, one plate of which is positioned by said magnetic compass and the other plate of which is aligned in response to data from said gyro, comprising a motion transmission device having relatively movable armature and field elements one of which is driven by said gyro, a motion repeating device having relatively movable armature and field elements one of which drives said second mentioned condenser plate into alignment, electrical connections between the armatures of said motion transmission and repeating devices, a normal field winding in each of said field elements energized from a common source, an additional field winding on the field element of one of said devices, and means for energizing said additional winding with control voltages varying as a function of angular position of said gyro, whereby to effect a cyclic angular difference between said gyro and said magnetic compass substantially equal and opposite to compass deviation errors.

21. In a radio direction finding system, comprising means for generating a control signal; a movable antenna; a motion translating device including data-transmitting and data-repeating elements and an electrical connection defining a data transmitting channel between said transmitting and repeating elements, said data-transmitting element being coupled to said antenna to transmit positional data therefrom to said repeating element, a rotary transformer having relatively rotatable armature and field members, a mechanical link between one of the members of said rotary transformer and said data transmitting element, and an electrical connection between the member of said rotary transformer and one of said elements and responsive to said control signal for modifying the flux field of said one element thereby to effect an asynchronous relation between said transmitting and repeating elements.

22. In an electrical motion-transmitting system, a dynamoelectric unit having relatively movable armature and field elements, one of said elements comprising a pair of quadrature windings, and electrical means for selectively exciting at least one of said windings with voltages varying in response to alteration in the relative position of said elements.

THOMAS O. McCARTHY.
WILBUR W. THOMAS.

REFERENCES CITED

The following references are of record in the file of this patent:

UNITED STATES PATENTS

| Number | Name | Date |
|---|---|---|
| 1,215,815 | Kaminski et al. | Feb. 13, 1917 |
| 1,890,891 | Vopel et al. | Dec. 13, 1932 |
| 2,227,474 | Weathers | Jan. 7, 1941 |
| 2,292,722 | Stiegler | Aug. 11, 1942 |
| 2,343,945 | Weathers | Mar. 14, 1944 |
| 2,408,813 | Riggs | Oct. 8, 1946 |

FOREIGN PATENTS

| Number | Country | Date |
|---|---|---|
| 395,764 | Great Britain | July 27, 1933 |